(12) United States Patent
Dykstra

(10) Patent No.: US 7,270,141 B2
(45) Date of Patent: Sep. 18, 2007

(54) METHODS AND SYSTEMS FOR CONTROLLING VISCOSITY IN REAL TIME

(75) Inventor: Jason D. Dykstra, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 256 days.

(21) Appl. No.: 11/003,727

(22) Filed: Dec. 2, 2004

(65) Prior Publication Data

US 2006/0118170 A1   Jun. 8, 2006

(51) Int. Cl.
G05D 11/13 (2006.01)
G05D 24/02 (2006.01)
F17D 1/16 (2006.01)

(52) U.S. Cl. ............... 137/92; 137/114; 137/487.5; 700/31; 700/285

(58) Field of Classification Search ............... 137/13, 137/92, 111, 114, 487.5; 700/282, 285, 29, 700/30, 31; 702/50
See application file for complete search history.

(56) References Cited

U.S. PATENT DOCUMENTS 4,420,008 A * 12/1983 Shu .................. 137/4
4,982,756 A * 1/1991 Scribner .................. 137/4
6,648,082 B2  11/2003 Schultz et al. ............... 175/39
6,681,189 B1 * 1/2004 Morrison et al. ............ 702/45
2002/0198668 A1* 12/2002 Lull et al. .................... 702/45

FOREIGN PATENT DOCUMENTS

DE         2346880     *   9/1973
JP       06154570 A    *   6/1994
WO      WO 83/00101    *   1/1983

* cited by examiner

Primary Examiner—Ramesh Krishnamurthy
(74) Attorney, Agent, or Firm—John W. Wustenberg; Baker Botts, L.L.P.

(57) ABSTRACT

Systems and methods are disclosed for controlling a viscosity of a fluid. The control system includes a controller controlling an input to an actuator and an observer estimating the viscosity of the fluid. The controller includes an input, and the actuator is capable of controlling a viscosity of a fluid by delivering a gelling agent to the fluid. The observer and the controller are coupled together. The observer may be used to determine the viscosity at the current time from a sensor and filter combination that lags the actual viscosity value. The estimated sensor and filter output may be then compared to the sensor and filter output to make corrections to the estimate of the viscosity of the current time.

23 Claims, 13 Drawing Sheets

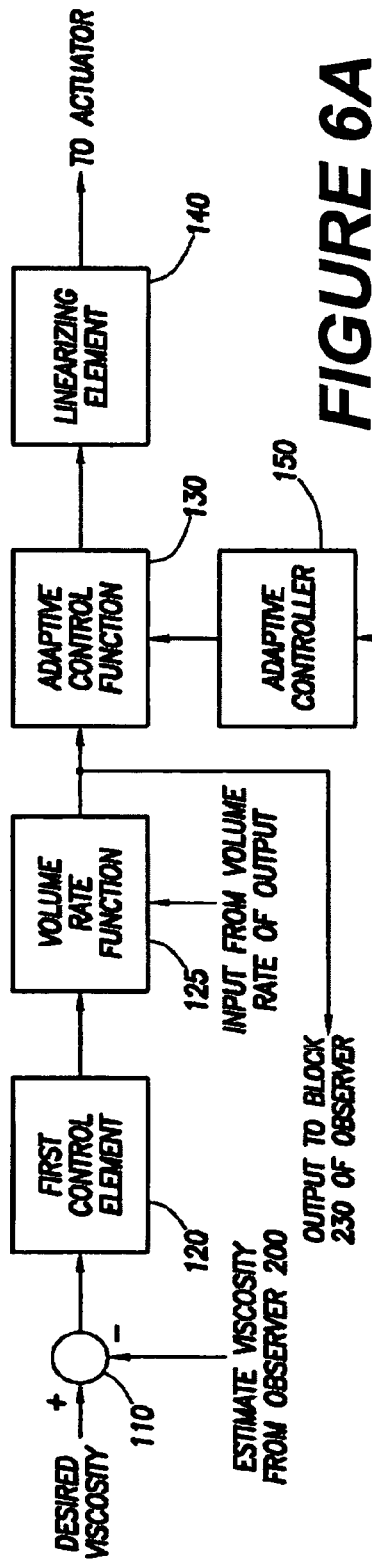
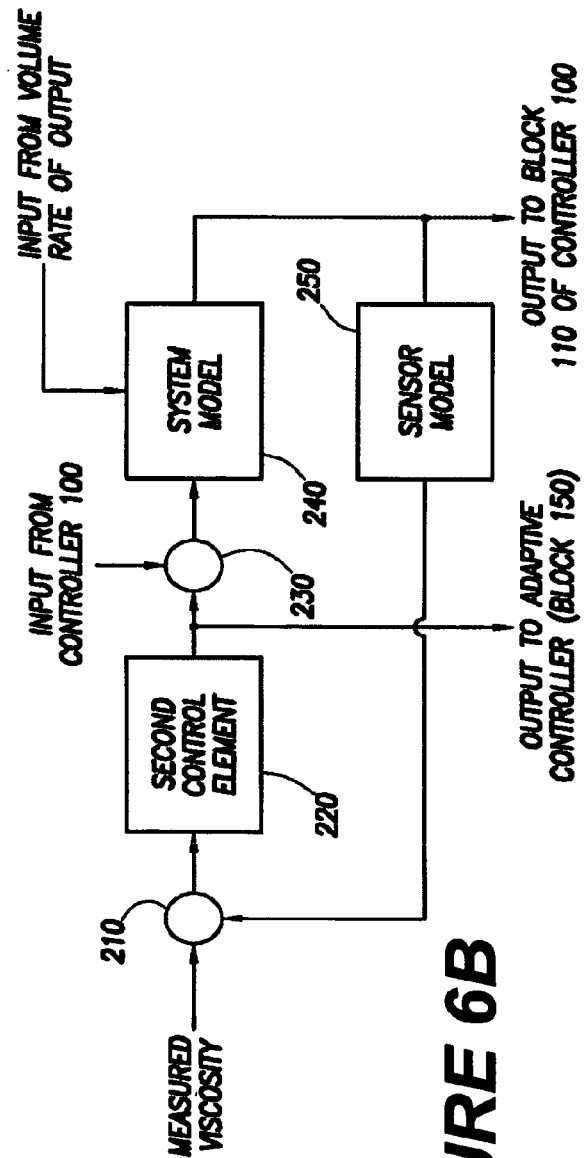
*FIGURE 6A*
*FIGURE 6B*

METHODS AND SYSTEMS FOR CONTROLLING VISCOSITY IN REAL TIME

BACKGROUND

Many processes require control of one or more parameters. For example, during exploration and production of hydrocarbons, it may be desirable to control the viscosity of a gel or fluid used to transfer proppant to a fracture location downhole. Proppant consistency may depend, in part, on control of viscosity. Viscosity may be controlled by the selective addition of a gelling agent to the fluid or gel used to carry the proppant. The selective addition of the gelling agent may be controlled by one or more actuators. One technique to control fluid viscosity is to proportion the inputs to the viscosity system. For example, the amount of gelling agent added to the fluid may be proportional to the magnitude of the desired viscosity change in the fluid. Another technique for controlling viscosity is based upon conventional proportional-integral-derivative control (PID) techniques applied to the system inputs (e.g., desired viscosity) measured relative to the measured fluid viscosity.

Conventional techniques for viscosity control are not optimally suited to viscosity control for many reasons. Conventional viscosity control techniques typically exhibit significant time delay, which may complicate or even compromise viscosity control. For example, the viscosity sensors and filters that measure viscosity may exhibit a delayed response. As a result, the viscosity measured by the sensors and filters in the system may not be an accurate representation of the viscosity of the fluid to which the gelling agent is added.

Another source of time delay stems from the dynamics associated with the process of the mixing and flow process from the source of mixing the gelling agent and the fluid to the location of the viscosity sensor. The addition of a gelling agent to the fluid does not instantaneously change the viscosity of the fluid to a steady state value. Rather, the viscosity of the fluid may exhibit temporal and spatial variations following the addition of a gelling agent to the fluid. Moreover, viscosity sensors are typically located downstream from the source of mixing the gelling agent and the fluid. As a result, the temporal response of the viscosity as measured by the viscosity sensor may be a delayed approximation of the viscosity of the fluid at the source of mixing. Furthermore, following an increase in the desired fluid flow rate, conventional approaches may require several minutes of response time before a steady state fluid viscosity is obtained.

Viscosity control systems typically exhibit a nonlinear viscosity output in response to a liner input. For example, a linear change in the input signals to the actuators that control the addition of the gelling agent to the fluid may result in a nonlinear viscosity change. Control systems based upon proportional or PID control techniques, or variants thereof, may not be optimal systems for viscosity control, especially when used to control a nonlinear system.

BRIEF DESCRIPTION OF THE DRAWINGS

A more complete understanding of the present disclosure and advantages thereof may be acquired by referring to the following description taken in conjunction with the accompanying drawings wherein:

FIG. 6A represents another embodiment of an example of a controller block according to the present invention;

FIG. 6B represents another embodiment of an example of a observer block according to the present invention;

Figure 1A:
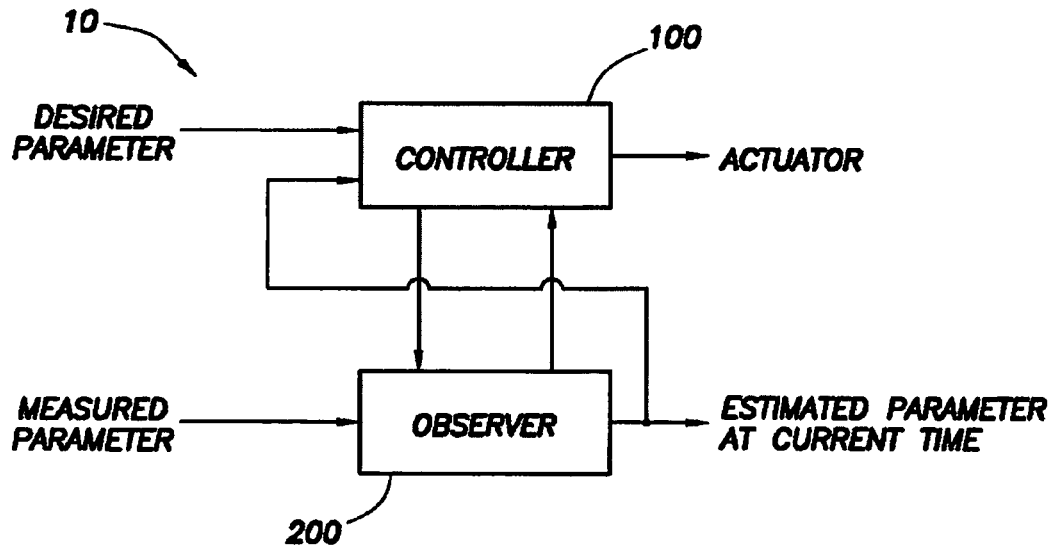
FIG. 1A represents a block diagram of a control system for controlling the viscosity of a fluid according to the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

SUMMARY

The present invention relates, in general, to process control, and more particularly to controlling fluid viscosity.

In accordance with a first aspect of the present invention, a method of controlling a viscosity of a fluid comprises the steps of inputting a desired viscosity into a controller and inputting a measured viscosity into an observer. The controller includes a first control element having a first control function. The observer includes a second control element having a second control function, a system model, and a sensor model. The method further includes the steps of determining an estimated viscosity from the observer at current time and determining a viscosity control error between a desired viscosity and the estimated viscosity. A controller control signal is generated by applying a first control function to the viscosity control error. Further, the method includes determining a viscosity measurement error between the measured viscosity and the estimated viscosity. An observer control signal is generated by applying a second control function to the viscosity measurement error to minimize the viscosity measurement error. Finally, the controller control signal is coupled to the observer, and the observer control signal is coupled to the controller.

In accordance with a second aspect of the invention, a method of controlling a viscosity of a fluid comprises the steps of inputting a desired viscosity into a controller which commands an actuator to control the quantity of fluid supply and inputting a measured viscosity into an observer which monitors the viscosity of the fluid according to a viscosity model. The method further includes the steps of determining an estimated viscosity from the observer at current time and determining a viscosity control error between a desired viscosity and the estimated viscosity. A controller control signal is generated by applying the viscosity control error to the controller to command the actuator. Further, the method includes determining a viscosity measurement error between the measured viscosity and the estimated viscosity. An observer control signal is generated by applying the viscosity measurement error to the observer to minimize the viscosity measurement error. Finally, the controller control signal is coupled to the observer, and the observer control signal is coupled to the controller.

In accordance with a third aspect of the invention, a control system for controlling a viscosity of a fluid in real time comprises a controller for controlling an actuator capable of controlling a viscosity of a fluid by delivering a gelling agent to the fluid, and an observer for estimating the viscosity of the fluid at current time. The observer and the controller are coupled together.

In one embodiment, the control system further comprises a first control element having an input which represents an error measured between a desired viscosity and the viscosity estimated by the observer, and an adaptive controller modifying an output of the first control element and generating a signal controlling an input of the actuator.

In another embodiment, the control system further comprises a first control element having an input which represents an error measured between a desired viscosity and the viscosity estimated by the observer, and a linearization element linearizing the viscosity of the fluid relative to a supply rate of the gelling agent for generating a signal controlling an input of the actuator.

In a further embodiment, the observer of the control system comprises a second control element having an input and an output, a system model having an input and an output, the input to the system model being a combination of the output of the first control element and the output from the second control element, the output from the system model being an estimation of the viscosity of the fluid, and a sensor model having an input and an output, the input to the sensor model being the output from the system model, the output from the sensor model being combined with a measured viscosity to form a viscosity error, the viscosity error being an input to the second control element.

In accordance with a fourth aspect of the invention, a control system for controlling a viscosity of a fluid in real time comprises an actuator capable of controlling a viscosity of a fluid by delivering a gelling agent to the fluid wherein the gelling agent has a supply rate. The control system also includes a controller for controlling an input to the actuator. The controller includes a first control element, an adaptive controller modifying an output of the first control element and a linearizing element linearizing the viscosity of the fluid relative to the supply rate of the gelling agent for generating a signal controlling the input of the actuator. The control system further includes an observer for estimating the viscosity of the fluid at current time. The observer and the controller are coupled together.

In still another embodiment, a control system for controlling a viscosity of a fluid is also disclosed. The control system comprises an actuator controlling a viscosity of a fluid by delivering a gelling agent to the fluid, and a controller controlling the input to the actuator. The gelling agent includes a supply rate, and the actuator includes an input. The controller includes an input. The controller comprises a first control element having an input and an output, an adaptive controller modifying the output of the first control element, and a linearization element linearizing the viscosity of the fluid relative to the supply rate of the gelling agent. The control system also includes an observer for estimating the viscosity of the fluid. The observer includes an input and an output. Further, the observer is coupled to the controller.

The features and advantages of the present invention will be readily apparent to those skilled in the art upon a reading of the description of the exemplary embodiments which follows.

DETAILED DESCRIPTION

The present invention relates, in general, to process control, and more particularly to controlling fluid viscosity.

The disclosed control system may be used to control the viscosity of a mixing process whose inputs are controlled through a controllable actuator. The controllable actuator may be used to control the addition of a gelling agent to the fluid. The control system may be used for gel mixing with a fluid. In another implementation, the control system may be used with a dry powder that may be mixed with a fluid to effect a change in fluid viscosity.

Figure 1B:
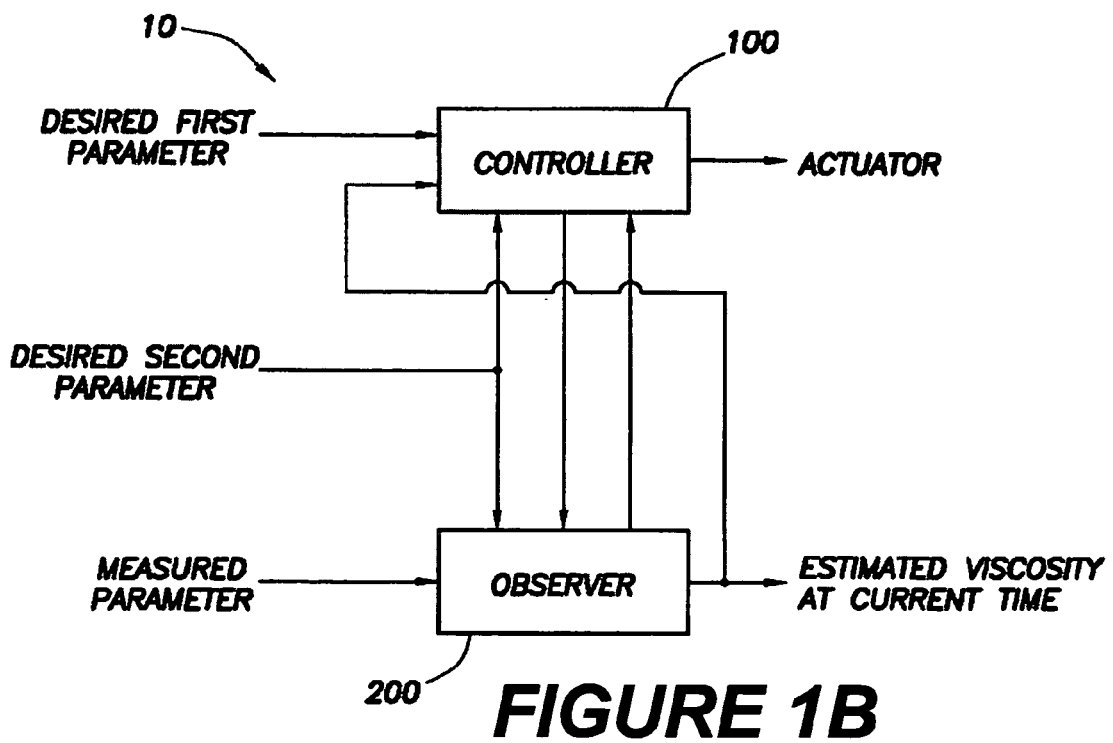
FIG. 1B represents a block diagram of a control system for controlling the viscosity of a fluid according to another embodiment of the present invention.

The details of the present invention will now be described with reference to the figures. Referring now to FIG. 1, an embodiment of the present invention is presented. Control system 10 depicted in FIG. 1A comprises a controller block 100 and an observer block 200. Inputs to controller block 100 include a desired parameter and the output from observer block 200. One example desired parameter may be a desired viscosity of a fluid. The input to observer block 200 may include a measured first parameter such as a measured viscosity. As depicted by the two arrows pointing from observer block 200 to controller block 100 and by the arrow pointing from controller block 100 to observer block 200, observer block 200 and controller block 100 are coupled together. Optionally, in another embodiment, a second parameter may be inputted into control system 10. For example, the second parameter may be inputted into both controller block 100 and observer block 200. In one implementation, the second parameter may be the output flow rate of the fluid whose viscosity is being controlled.

The output of control system 10 may control an actuator, which in turn, may control the first parameter. For example, control system 10 may control the addition of a gelling agent to a fluid. The viscosity of the fluid may be controlled by controlling the amount of a gelling agent added to the fluid. In one embodiment, a supply tank may store the fluid whose viscosity is being controlled. Viscosity of the fluid may be effected, for example, by the addition or removal of fluid from the supply tank, by the addition of a gelling agent to the tank, or by the amount of fluid in the tank. One skilled in the art with the benefit of this disclosure will recognize that in some embodiments, the control system may include an actuator for controlling the addition of the gelling agent to a fluid.

Figure 2:
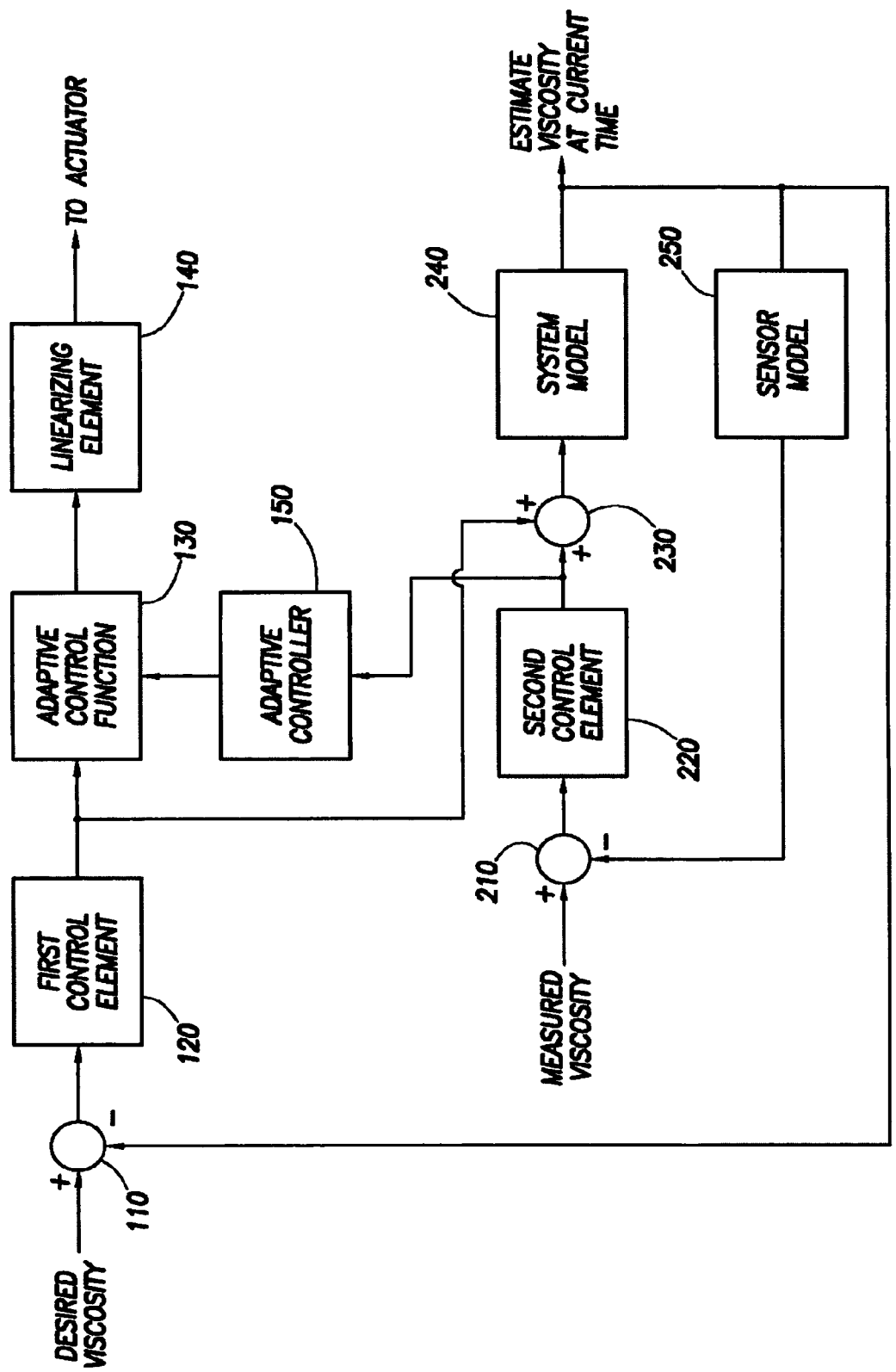
FIG. 2 represents one embodiment of a control system for controlling the viscosity of a fluid according to the present invention.

One embodiment of a fluid viscosity control system is shown in FIG. 2. The example control system of FIG. 2 includes a first summation element 110, a first control element 120, an adaptive control function 130, a linearization function 140, and an adaptive controller 150. The output of linearization function 140 may be used to control an actuator. The fluid viscosity control system may also include a second summation element 210, a second control element 220, a third summation element 230, a system dynamics model 240, and a sensor model 250. The output of system model 240 shown in FIG. 2 is an estimated value of the viscosity at a current time. Inputs to the control system may include a desired fluid viscosity and a measured fluid viscosity.

Figure 3A:
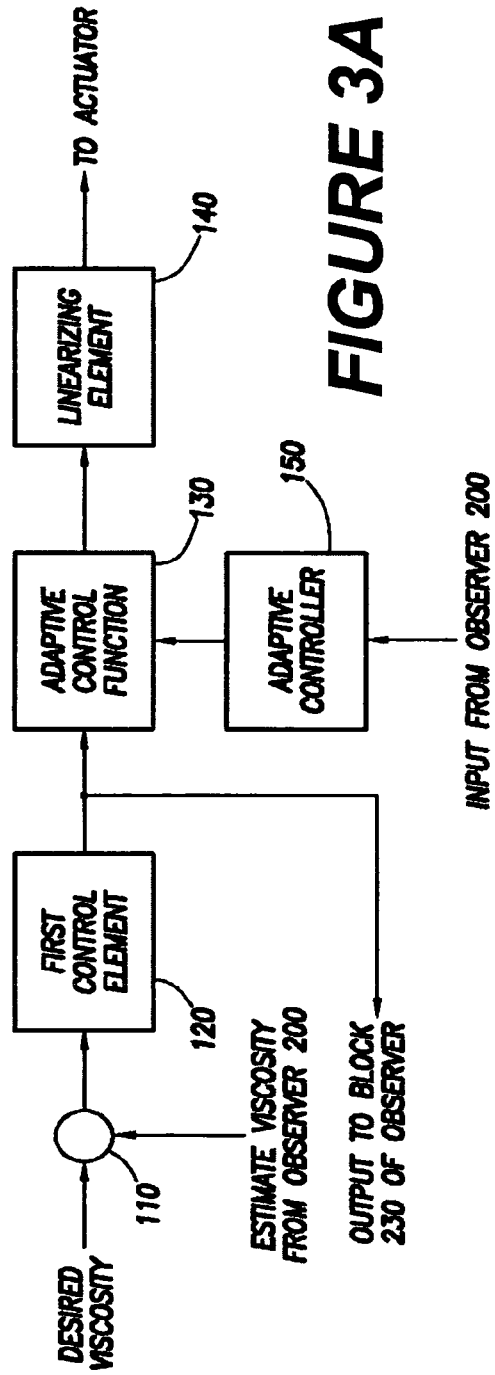
FIG. 3A represents one embodiment of an example of a controller block according to the present invention.
Figure 3B:
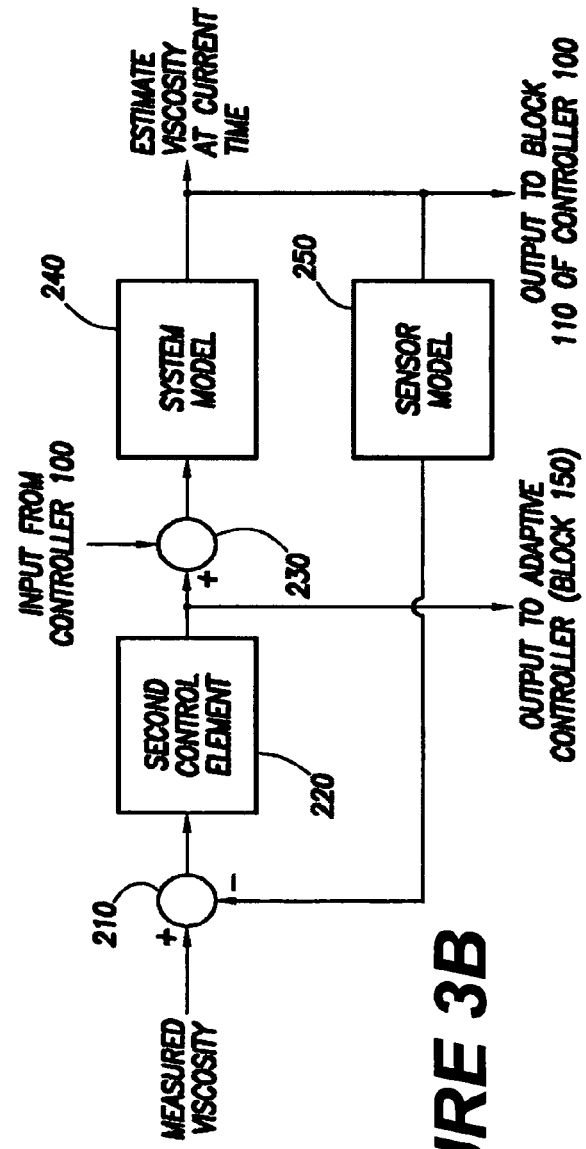
FIG. 3B represents one embodiment of an example of a observer block according to the present invention.

The implementation of the control system depicted in FIG. 2 may be divided into a controller block 100 and an observer block 200. One embodiment of controller block 100 is depicted in FIG. 3A. Controller block 100 includes first summation element 110, first control element 120, adaptive control function 130, adaptive controller 150, and linearizing element 140. FIG. 3B depicts one embodiment of observer block 200. In the example shown in FIG. 3B, observer block 200 includes second summation element 210, second control element 220, third summation element 230, system model 240, and sensor model 250.

First summation element 110 calculates an error measure between a desired fluid viscosity and an estimated fluid viscosity from observer block 200. In one example, the error measured may be calculated by subtracting the observer's estimated fluid viscosity from the desired fluid viscosity. The output of first summation element 110 communicates with the input to first control element 120.

Figure 4:
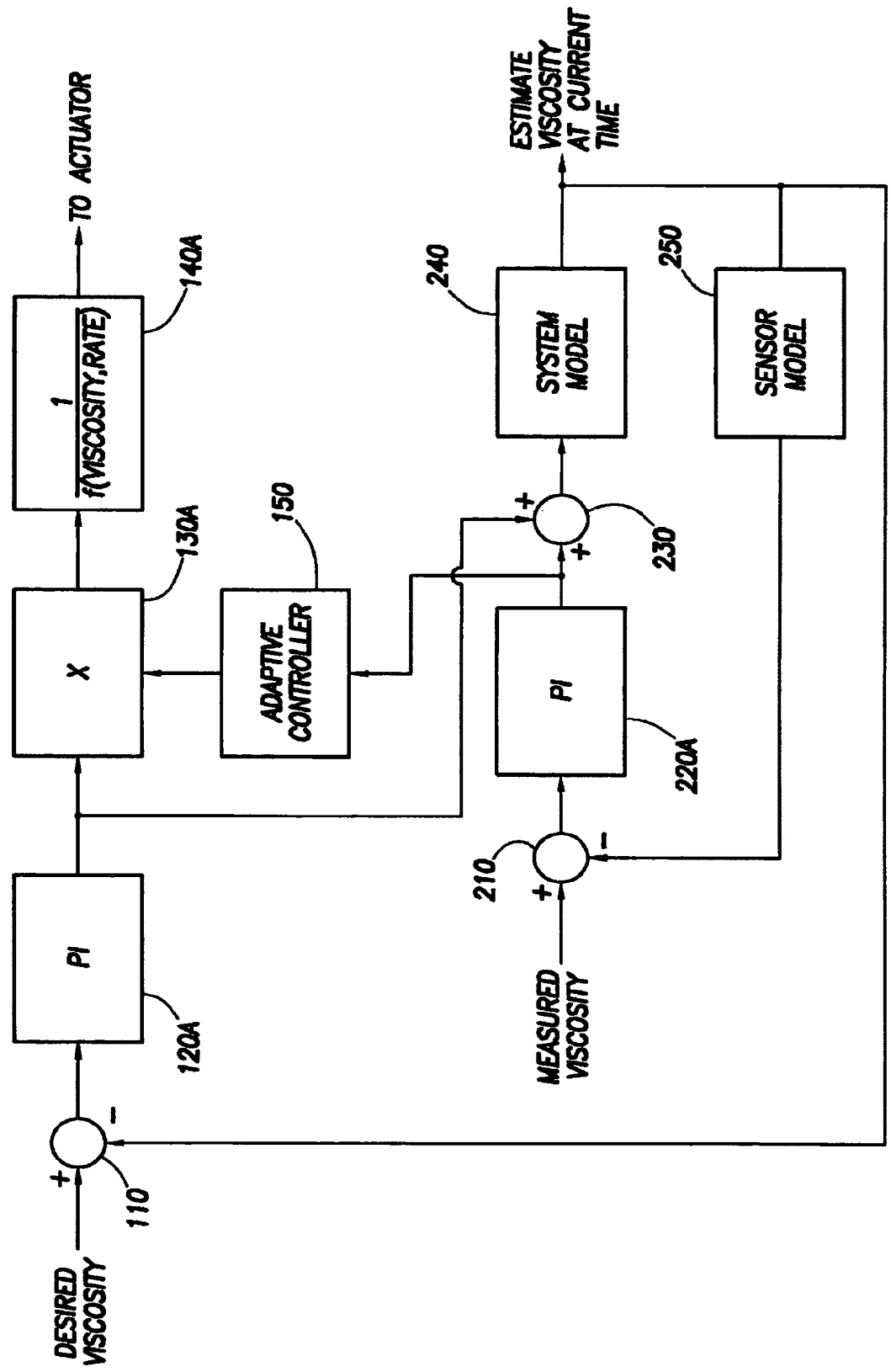
FIG. 4 represents another example control system for controlling the viscosity of a fluid according to the present invention.

First control element 120 may be implemented in various forms. For example, as shown in FIG. 4, first control element 120 may be a Proportional-Integral (PI) device 120A. In another embodiment, first control element 120 may be a Proportional-Integral-Derivative (PID) device. One skilled in the art with the benefit of this disclosure will recognize other functions that may be used as first control element 120.

The example control system shown in FIGS. 2 and 3 also includes adaptive controller 150 and adaptive control function 130. Adaptive controller 150 may modify the response of the control system to system changes that occur over time. In the embodiment shown in FIGS. 2 and 3, the output of second control element 220 is fed into adaptive controller 150. In one example, the viscosity of the fluid in the supply tank may be a function of the volume of the fluid in the supply tank. Adaptive controller 150 may be used to account for changes in the system that occur over time, such as changes in the viscosity of the fluid in the supply tank as the volume of fluid in the supply tank is varied. In another example, the output from the third summation element 230 may be used as the input to adaptive controller 150.

The viscosity of the fluid in the supply tank may be a function of the volume of fluid in the supply tank. For example, as the fluid approaches the top of the supply tank, the viscosity may be reduced to about 85% of the expected viscosity. Adaptive controller 150 may account for this reduction in viscosity as a function of fluid height and may accordingly change the input to the actuator. The inclusion of an adaptive controller 150 in a viscosity control system should provide a better estimate of viscosity by the observer block.

Adaptive controller 150 may be implemented in various forms. For example, adaptive controller 150 may be an integral function. An integral adaptive controller may be implemented, if, for example, the system includes substantial noise. The adaptive controller 150 may also be implemented as a PI controller or as a PID controller. One skilled in the art with the benefit of this disclosure will recognize that adaptive controller 150 may be implemented in other forms.

The adaptive controller 150 will be used to drive the input into the system from the PID in the observer block to zero. With a good model of this system, the input from the PID in the observer block represents the error in the actuator supply system. Using the adaptive controller 150, it will drive the error in the actuator supply system to zero, allowing for better control over the process by increasing the accuracy of the estimated viscosity at the current time. The adaptive controller 150 can also be replaced with a direct error decoupling term to remove the errors directly. Under a situation in which sensor noise is prevalent, it may be best to use an adaptive approach or use the input from the integral term in the observer PID to decouple the actuator supply error.

The output of first control element 120 is fed into adaptive control function 130 in the implementation shown in FIGS. 2-4. Adaptive control function 130 may take many forms. In the implementation shown in FIG. 4, adaptive control function 130 may comprise a multiplicative function 130A. For example, the output of adaptive controller 150 may be multiplied by the output of first control element 120. Adaptive control function 130 may also be implemented as an additive function. In this case, the output of adaptive controller 150 is added to the output of the first control element 120. One skilled in the art with the benefit of this disclosure will recognize that adaptive controller 150 and adaptive control function 130 may be implemented in various other fashions.

Control system 100 may also include linearizing function 140. In the example shown in FIGS. 2-7, the output of adaptive control function is fed into linearizing function 140. The linearizing function may linearism the response of the system with respect to the output of first control element 120. In another implementation, linearizing function 140 may linearism the response of the system to the output of adaptive control function 130. Linearizing function 140 may be implemented such that the resulting viscosity of the fluid is a linear function with respect to the input to linearizing function 140. In other words, a linear change in the input to linearizing function 140 produces a linear change in the fluid viscosity.

The use of a linearizing function may improve the performance of the control system. The PI or a PID controller is a first order system that may reduce the amount of error in the system. When applied to a nonlinear system, the eigenvalues of a PI or PID controller may drift and accordingly, the performance of the control system is less than optimal. The linearizing function may account for some of the nonlinear effects in the system, and correspondingly reduce the amount of eigenvalue drift that may be present in the system. As a result, the linearizing function may improve the performance of the control system.

One skilled in the art with the benefit of this disclosure will recognize that linearizing function 140 may be implemented in various fashions. In one implementation, linearizing function 140 may be a function of the viscosity and the fluid flow. In another implementation, linearizing function 140 may further model the change in viscosity relative to the amount of gelling agent added to the supply tank. For example, the viscosity of the fluid may be a nonlinear function of the amount of gelling agent added to the fluid. In general, linearizing function 140 may be a function of the gelling agent, the fluid flow rate, the actuator response, and the viscosity of the fluid.

Following a derivation of a model of the effect of the input to the actuator on viscosity, as shown in FIG. 4, one implementation of linearizing function 140 may comprise determining the mathematical inverse of that derived function. The derived function would be the input signal to the actuator relative to the output viscosity. With most gelling agents, the change in viscosity is non-linear function of the amount of gelling agent added. Most actuators that would control the gelling agent are linear in their performance. The best input to output function for the applied control system would be a linear response of viscosity to input signal. Therefore, the linearizing function is added to change the nonlinear input signal to output viscosity to a linear input signal to output viscosity by covering the input to the actuator to an inverse of the nonlinear function, effectively canceling out the nonlinearity.

In some systems, fluid viscosity may be controlled by the addition of a gelling agent to the fluid. Furthermore, fluid viscosity may be measured downstream from the supply tank into which the gelling agent is added. In some cases, the fluid viscosity measured downstream from the supply tank is different from the fluid viscosity measured in the supply tank. For example, an addition of a gelling agent to the fluid in the supply tank may not create an instantaneous change in fluid viscosity. Rather the fluid viscosity may have an associated dynamic profile describing the change in fluid viscosity over time and space following an addition of the gelling agent. Consequently, a measurement of the viscosity of the fluid by the downstream sensor may not be an accurate representation of the viscosity of the fluid in the supply tank. Therefore, an observer block may be used to estimate the viscosity of the fluid in the supply tank based in part on one or more downstream viscosity measurements taken by a sensor. In one example, the viscosity sensor may be placed sufficiently downstream from the fluid tank such that the measured viscosity is a time delayed approximation of the viscosity of the fluid in the supply tank.

Second summation element 210 located in the observer block calculates an error measure between a measured fluid viscosity and an estimated fluid viscosity from observer block 200. In one example, the error measured may be calculated by subtracting a modified estimated viscosity value from the measured viscosity. The estimated viscosity value may be modified by sensor model 250. The output of second summation element 210 is fed into the input to second control element 220.

Second control element 220 may be implemented in various forms. For example, as shown in FIG. 4, second control element 220A may be a Proportional-Integral (PI) device 220A. In another embodiment, second control element 220 may be a Proportional-Integral-Derivative (PID) device. One skilled in the art with the benefit of this disclosure will recognize other forms of second control element 220. In the example shown in FIGS. 2-4, the output of second control element is combined with the output from first control element 120 and fed into a system model.

The system model 240 shown in FIGS. 2-4 may model the viscosity dynamics of the system from the source of mixing the gelling agent and the fluid to the sensor location. System model 240 may model spatial and temporal variations in the viscosity of the fluid and may estimate the viscosity of the fluid at the supply tank based, in part, on fluid viscosity measurements by a viscosity sensor located downstream from the supply tank. In one embodiment, system model 240 does not include a model of linearizing element 140.

The system model may be implemented in various fashions. For example, the sensor may be located at a distance sufficiently downstream from the source of mixing such that 100% mixing may be assumed to have occurred. Based on this assumption, the model of the system dynamics may be a pure time lag. Using this model, the viscosity of the fluid measured by the sensor is a time delayed measurement of the viscosity of the fluid in the supply tank. In another embodiment, the system model may be based on the assumption that less than 100% mixing occurred by the time the fluid has passed the sensor. In this case, system model 240 may comprise a dynamic model of the viscosity of the fluid as a function of distance and time. In yet another embodiment, system model 240 may model the effects of temperature variations on the fluid viscosity.

The system may also include a secondary mixing or storage chamber; therefore, the model may also contain the mixing dynamics relative to this chamber. The system may also be considered to contain the entire mixing, pumping and delivery system. The model would then be used to predict the final delivered viscosity if no sensor was present at the delivery point.

The output of system dynamic model 240 is the estimated viscosity of the fluid in the supply tank at the current time. As depicted in FIGS. 2-4, the estimated viscosity may be fed back within the observer block to form a viscosity error which may be measured relative to the measured viscosity from the viscosity sensor. The output of second summation element 210 is a viscosity error associated with the observer. PI controller 220 attempts to drive the observer's viscosity error to zero. In another embodiment, a PID controller may be used instead of a PI controller.

Because the observer block estimates viscosity of the fluid regardless of the sensor dynamics or location, a filter model is placed in the feedback loop to account, in part for the time difference between the estimated and measured viscosity. The sensor model may improve real time control of the system by removing most of the sensor filter delay when estimating fluid viscosity. In one embodiment, the sensor model comprises a first order mathematical approximation of the sensor and filters used to measure viscosity. One example sensor and filter comprises a Brookfield TT100 viscometer and uses a $1^{st}$ order lag to filter out the signal noise. The corresponding sensor model 250 comprises a $2^{nd}$ order system model to represent a mass—spring—damper for the sensor and a discrete $1^{st}$ order lag filter such as:

$$\omega_n^2/(s^2+2z\omega_n+\omega_n^2)$$

for the sensor, where $\omega_n$ is the natural frequency and z is the dampening. The filter would be $Z\{1/(ts+1)\}$ where t is the time constant.

As shown in FIGS. 1-7, controller block 100 and observer block 200 may be coupled together. For example, the observer's estimated viscosity is fed back as an input to controller block 100. Additionally, the output of the first control element may be used as an input to third summation element 230 to enhance the response time of the control system. The input to the second control element, a measured viscosity, is delayed in both time and space as compared with the actual viscosity of the fluid in the supply tank. Consequently, the combination of the second control element output with a feed forward of the desired viscosity produces an observer block that may estimate more accurately the viscosity of the fluid.

Additional coupling between controller block 100 and observer block 200 occurs via a negative feedback of the viscosity estimate from observer block 200 into first summation element 110. The output of first summation element 110 is a viscosity error measured between the desired viscosity and the estimated viscosity. Further as shown in FIGS. 2-4, the output from the second control element may be used as an input to adaptive controller 150. The measured viscosity error as determined by the observer block is coupled to controller block 100 through adaptive controller 150. By accounting for some of the real time changes in the system based upon estimates from observer block 200, adaptive controller 150 enhances the control system response.

Figure 5:
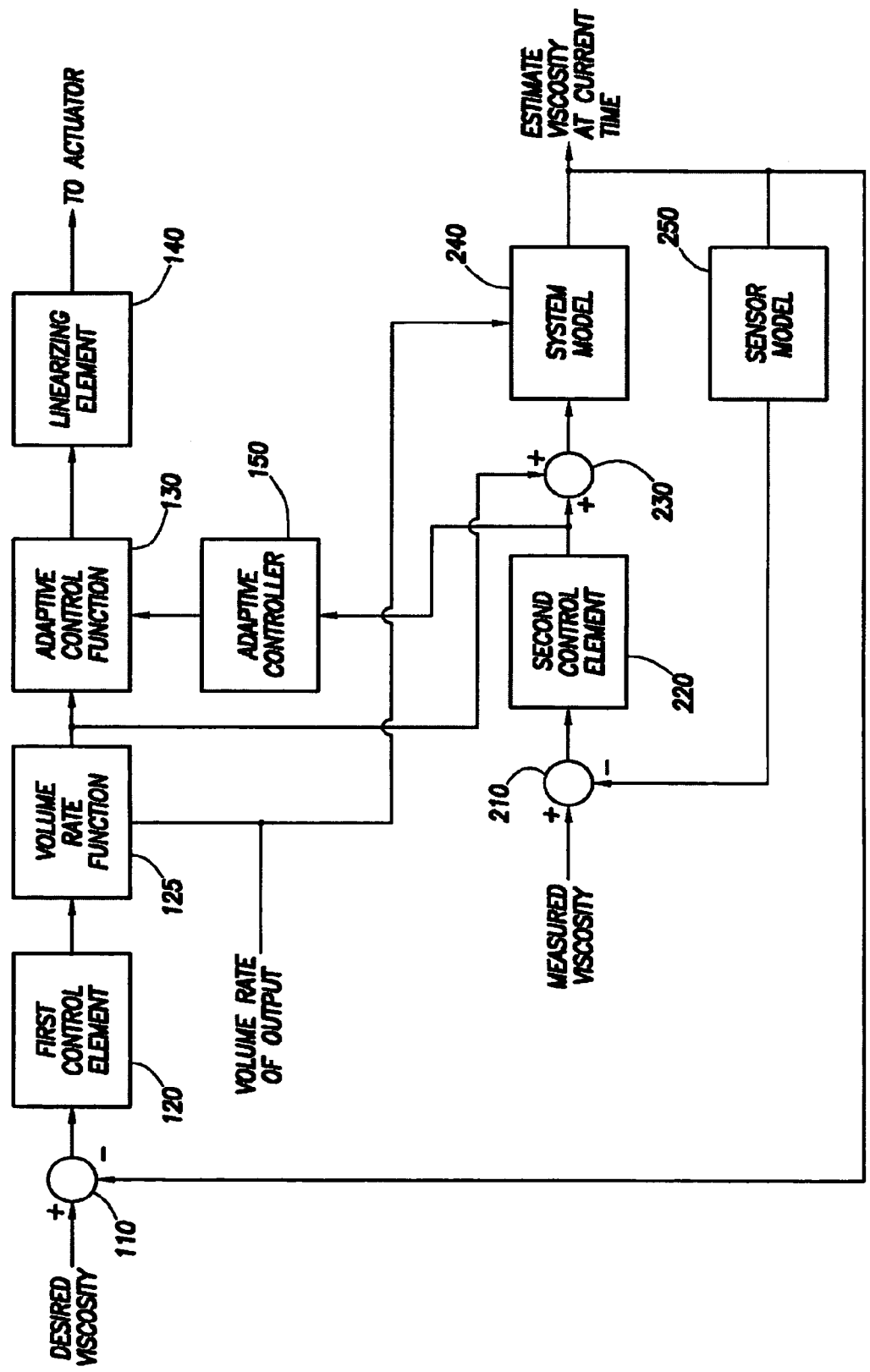
FIG. 5 represents another embodiment of a control system for controlling the viscosity of a fluid according to the present invention.
Figure 7:
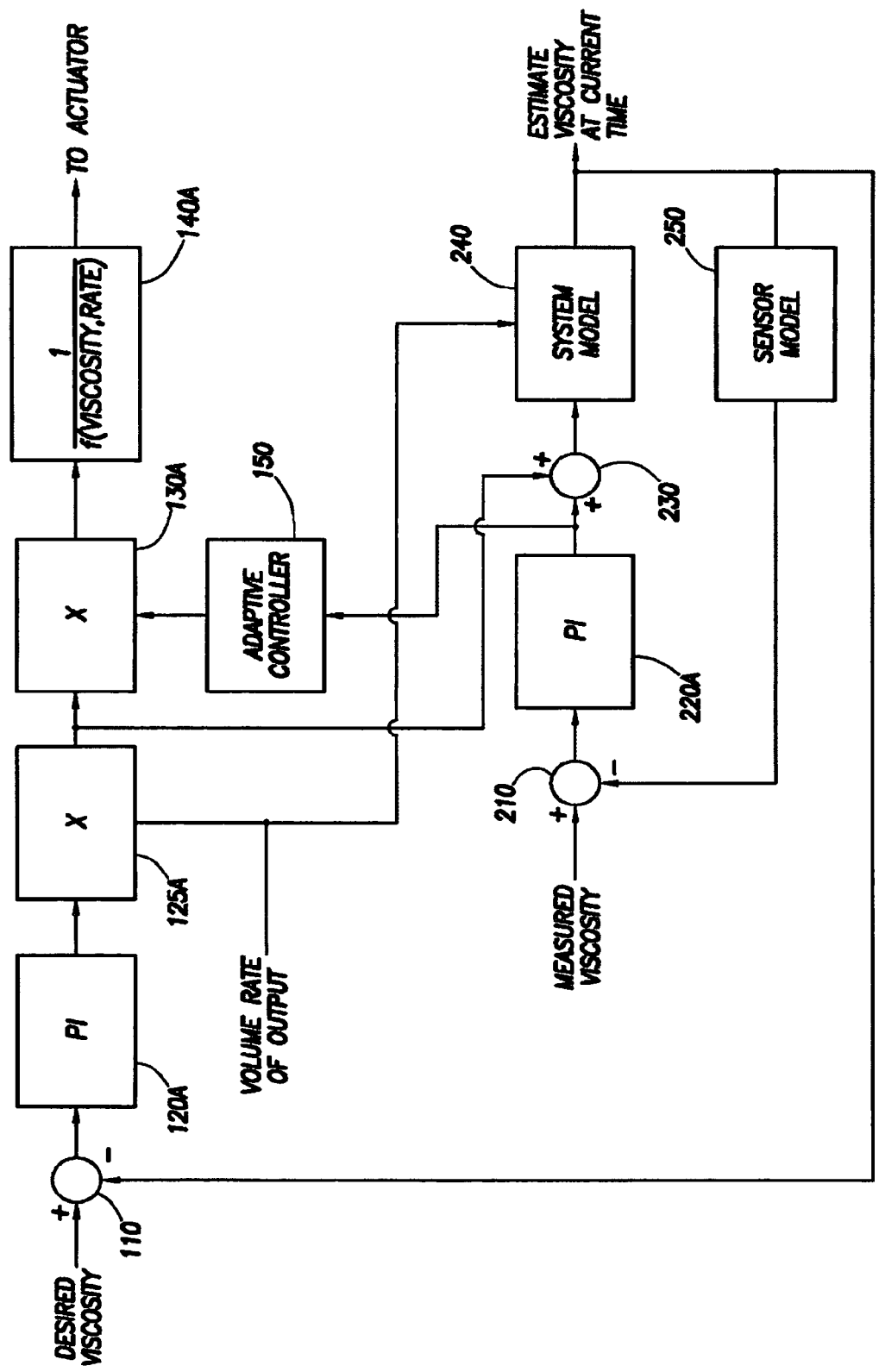
FIG. 7 represents another example control system for controlling the viscosity of a fluid according to the present invention.

In another implementation of a control system, the output rate of the fluid flow may be decoupled from the control of the fluid viscosity. As shown in FIGS. 5-7, this implementation may include as an input to the system the volume rate of the fluid whose viscosity is being controlled. The volume flow rate may be inputted into both controller block 100 and observer block 200.

FIGS. 5-7 show an implementation of a control system having as inputs the desired flow rate, the volume rate of output and the measured viscosity. One implementation of controller block 100 includes first summation element 110, first control element 120, rate modifying function 125, adaptive controller function 130 and linearizing element 140. The inputs to first summation element 110 in the implementation shown in FIGS. 5-7 include the desired viscosity and the estimated viscosity estimated from observer block 200. The output from summation element 110 is an error measure between the desired viscosity and an estimated viscosity. The error is then fed into first control element 120.

As shown in FIG. 7, first control element 120 may be a PI controller 120A. In another implementation, first control element 120 may be a PID controller. One skilled in the art with the benefit of this disclosure will recognize that forms other than a PI or a PID controller may be used for first control element 120.

The output of PI controller 120 may described as the commanded volumetric rate ratio. The commanded volumetric rate ratio may be multiplied by a volume rate function 125 to minimize the effects of fluid flow rates on changes in output viscosity. In other word, the output viscosity may be decoupled from the volume rate of fluid. In the example shown in FIG. 7, the volume rate function 125 is selected to be a multiplicative function 125A. As a result, the output of first control element 120 is multiplied by volume rate function 125A. One skilled in the art with the benefit of this disclosure will recognize that other forms for volume rate function may be used, including an additive function. In the implementation shown in FIGS. 5-7, the output of rate modifying function 125 is multiplied by the adaptive controller function 130 and by the linearizing element 140.

The adaptive control function 130 may be selected to be a multiplicative function 130A as shown in FIG. 7. In another implementation the adaptive control function 130 may be an additive function. The input to the adaptive control function for the implementation shown in FIGS. 5-7 is the output from adaptive controller 150. The adaptive controller serves to minimize the effects of some unmeasured changes on fluid viscosity, such as system drift and change in fluid viscosity as a function of supply tank height. One example adaptive controller is a PI controller. One skilled in the art with the benefit of this disclosure will recognize other forms for adaptive control function 130 and adaptive controller 150.

In one example, the adaptive controller function may minimize the effects of a viscosity gradient in the supply tank. Because the viscosity is typically a nonlinear function of the supply rate, a linearizing element may be used to linearize the output viscosity relative to the supply rate. The resultant product is fed as an input into the actuator in the implementation shown in FIGS. 5-7. One skilled in the art with the benefit of this disclosure will recognize that other forms for the linearizing function may be used in other implementations.

The observer block 200 depicted in FIGS. 5-7 includes a second summation element 210, a second control element 220, a third summation element 230, a system model 240 and a sensor model 250. The input to second summation element 210 may include a measured viscosity value and an estimated viscosity value from observer block 200. The estimated viscosity value is modified by the sensor model in the implementation shown in FIGS. 4 and 5A. The output of second summation element 210 is an error measure, which in turn is used as an input to second control element 220. In one implementation, PI controller 220A is chosen as the second control element. In another implementation, PID controller is chosen as the second control element. The output from PI controller 220 may be an approximation to the error due to the supply gradient and other negligible errors.

As described previously, controller block 100 may be cross coupled to observer block 200. As shown in FIGS. 5-7, controller block 100 and observer block 200 may be cross coupled to each other in at least three ways. The estimated viscosity from the observer block 200 is fed as an input to controller block 100 to form an error estimate that may be used as an input to PI controller 120. Additionally, adaptive controller 150 may couple the error as measured by the output of PI controller 220 to controller block 100. Further, the output of the volume rate function 125 of controller block 100 is coupled to third summation element 230.

By coupling controller block 100 to observer block 200, the response of the system to a change in either a desired viscosity or the desired fluid flow rate may be enhanced. Furthermore, the desired viscosity of the fluid should be maintained following a change in the desired flow rate of the fluid. For example, changes in the system inputs are simultaneously presented to controller block 100 and observer block 200. Moreover, errors propagating through the controller block 100 or observer block 200 are simultaneously coupled to the observer block 200 or controller block 100.

The implementation shown in FIGS. 5-7 may permit a system to maintain a constant viscosity following an increase in the fluid flow rate. For example, an increase in the flow rate of the fluid results in a modification of the output of the first controller 120 by the volume rate of the output at volume rate function 125. As shown in FIGS. 5-7, volume rate function 125 may be implemented as a multiplicative function, such that the output of the PI controller 120 is multiplied directly by the fluid flow rate. Consequently, an increase in the fluid flow rate may result in an increase to the input to the actuator, which in turn may increase the amount of gelling agent added to the fluid in the supply tank.

Concomitantly, the volume rate of flow input is also fed into the system dynamics model 240 shown in FIGS. 5-7. Assuming that the system dynamics model models the effects of flow rate on fluid viscosity, inputting the flow rate of the fluid into the observer block 200 should result in a more accurate estimation of the viscosity of the fluid in the supply tank and elsewhere in the mixing process.

The present invention discloses several approaches for improving the control of fluid viscosity. The input to the actuator may be sent through a viscosity to actuator motion linearizing function. This linearization function provides for linear changes in viscosity from unlinear changes in the input signal. Additionally, an observer may be used to determine the viscosity at the current time from a sensor and filter combination that lags the actual viscosity value. The observer may contain a model of the viscosity dynamics and the mixing source to sensor location dynamics to determine the estimated viscosity from the system inputs. The estimated viscosity may then be applied to the model of the sensor and filter dynamics to estimate the output of the sensor system. The estimated sensor and filter output may be then compared to the sensor and filter output to make corrections to the estimate of the viscosity at the current time. Furthermore, an adaptive controller may be used in conjunction with the system observer to adapt the actuator coefficients to account for unmeasured changes, such as temperature and actuator behavior.

The disclosed control systems may improve control of fluid viscosity by removing the effects of the time lag inherent in the viscosity sensor and filter in the feedback signal. Additionally, linearization of the input signal to viscosity changes should improve the use of a PID or PI controller in the viscosity loop. Furthermore, the use of an adaptive controller to change the actuator coefficients may account for unmeasured changes.

In one embodiment, a method of controlling a viscosity of a fluid is presented. The method comprises the steps of inputting a desired viscosity into a controller and inputting a measured viscosity into an observer. The controller includes a first control element having a first control function. The observer includes a second control element having a second control function, a system model, and a sensor model. The method further includes the steps of determining an estimated viscosity from the observer and determining a viscosity control error between a desired viscosity and the estimated viscosity. A controller control signal is generated by applying a first control function to the viscosity control error. Further, the method includes determining a viscosity measurement error between a measured viscosity and the estimated viscosity. An observer control signal is generated by applying a second control function to the viscosity measurement error to minimize the viscosity measurement error. Finally, the controller control signal is coupled to the observer, and the observer control signal is coupled to the controller.

In another embodiment, a control system for controlling a viscosity of a fluid is presented. The control system comprises a controller controlling an input to an actuator, and an observer estimating the viscosity of the fluid. The observer and the controller are coupled together. The controller includes an input, and the actuator is capable of controlling a viscosity of a fluid by delivering a gelling agent to the fluid. The observer includes an input and an output.

In another embodiment, a control system for controlling a viscosity of a fluid is disclosed. The control system comprises an actuator capable of controlling a viscosity of a fluid by delivering a gelling agent to the fluid. The actuator includes an input. The control system also includes a controller controlling the input to the actuator. The controller includes an input. The control system further includes an observer to estimate the viscosity of the fluid. The observer and the controller are coupled together.

In still another embodiment, a control system for controlling a viscosity of a fluid is also disclosed. The control system comprises an actuator controlling a viscosity of a fluid by delivering a gelling agent to the fluid, and a controller controlling the input to the actuator. The gelling agent includes a supply rate, and the actuator includes an input. The controller includes an input. The controller comprises a first control element having an input and an output, an adaptive controller modifying the output of the first control element, and a linearization element linearizing the viscosity of the fluid relative to the supply rate of the gelling agent. The control system also includes an observer for estimating the viscosity of the fluid. The observer includes an input and an output. Further, the observer is coupled to the controller.

To facilitate a better understanding of the present invention, the following examples of exemplary embodiments are given. In no way should the following examples be read to limit the scope of the invention.

Figure 8:
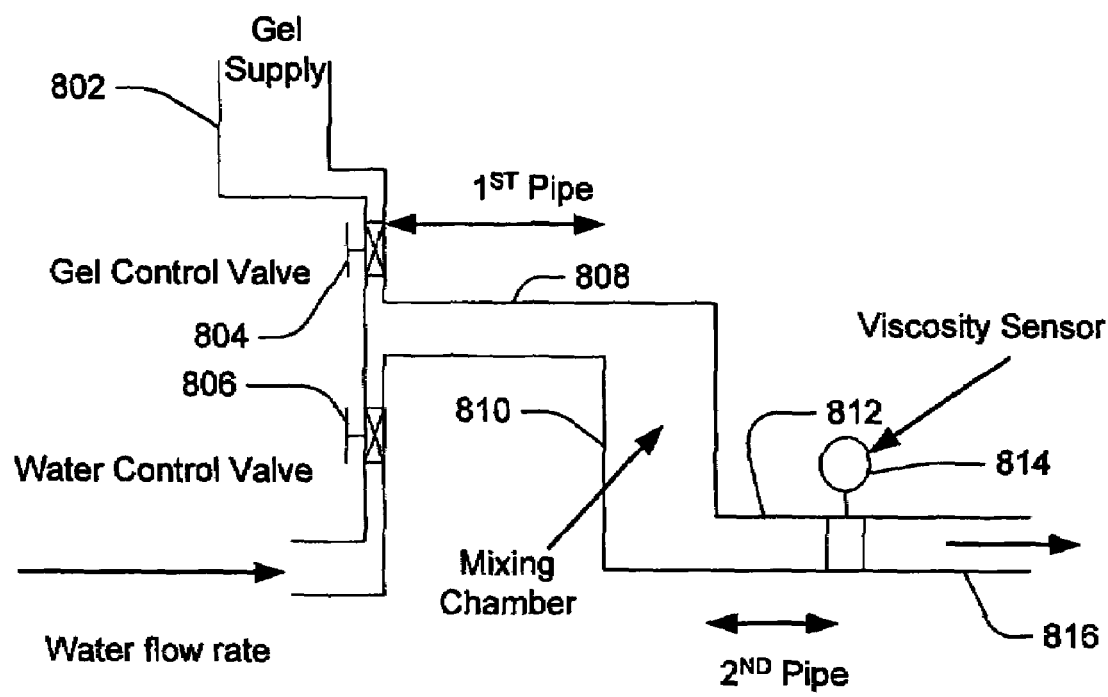
FIG. 8 illustrates a simulation physical system of an embodiment where a gelling fluid is mixed with water.

FIG. 8 illustrates a simulation physical system of an embodiment where, on one side, a gel container 802 supplies gel supply to a first pipe 808 through a gel control valve 804; and, on the other side, a water reservoir (not shown) supplies water to the first pipe 808 through a water control valve 806. The first pipe 808 which is 10 ft long with a cross sectional area of 0.5 square feet will delay the response of the system. The first pipe is connected to a mixing chamber 810 that has a volume of 2 cubic feet. In this particular implementation, two fluids that are mixed in the mixing chamber. In another implementation, more than two fluids can be supplied to the mixing chamber 810, each fluid being controlled by its own control valve.

The mixed fluid then flows to a second pipe 812 of 2 feet long with a cross sectional area of 0.5 square feet. The second pipe 812 is equipped with a viscosity sensor 814 which also operates as a filter to remove noise. The second pipe is connected to an outlet 816 from which the mixed fluid is dispensing.

Figure 9:
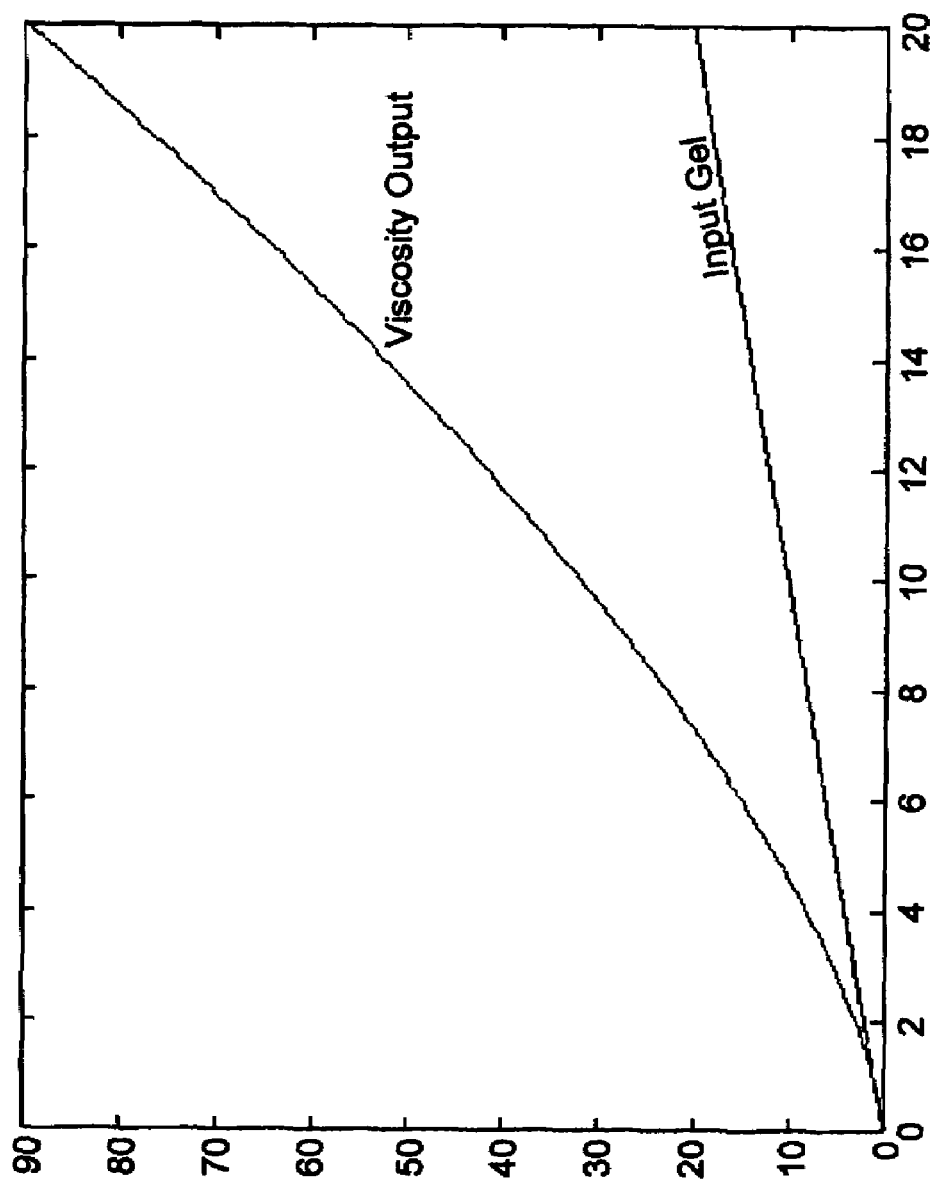
FIG. 9 shows a viscosity profile of a fluid.

FIG. 9 shows a viscosity profile of a fluid as a function of the percentage of input gel or the percentage of the opening of the control valve. This viscosity profile is non linear as expected and resembles to an exponential curve. The addition of a small input of gel fluid will affect significantly the viscosity output.

Figure 10:
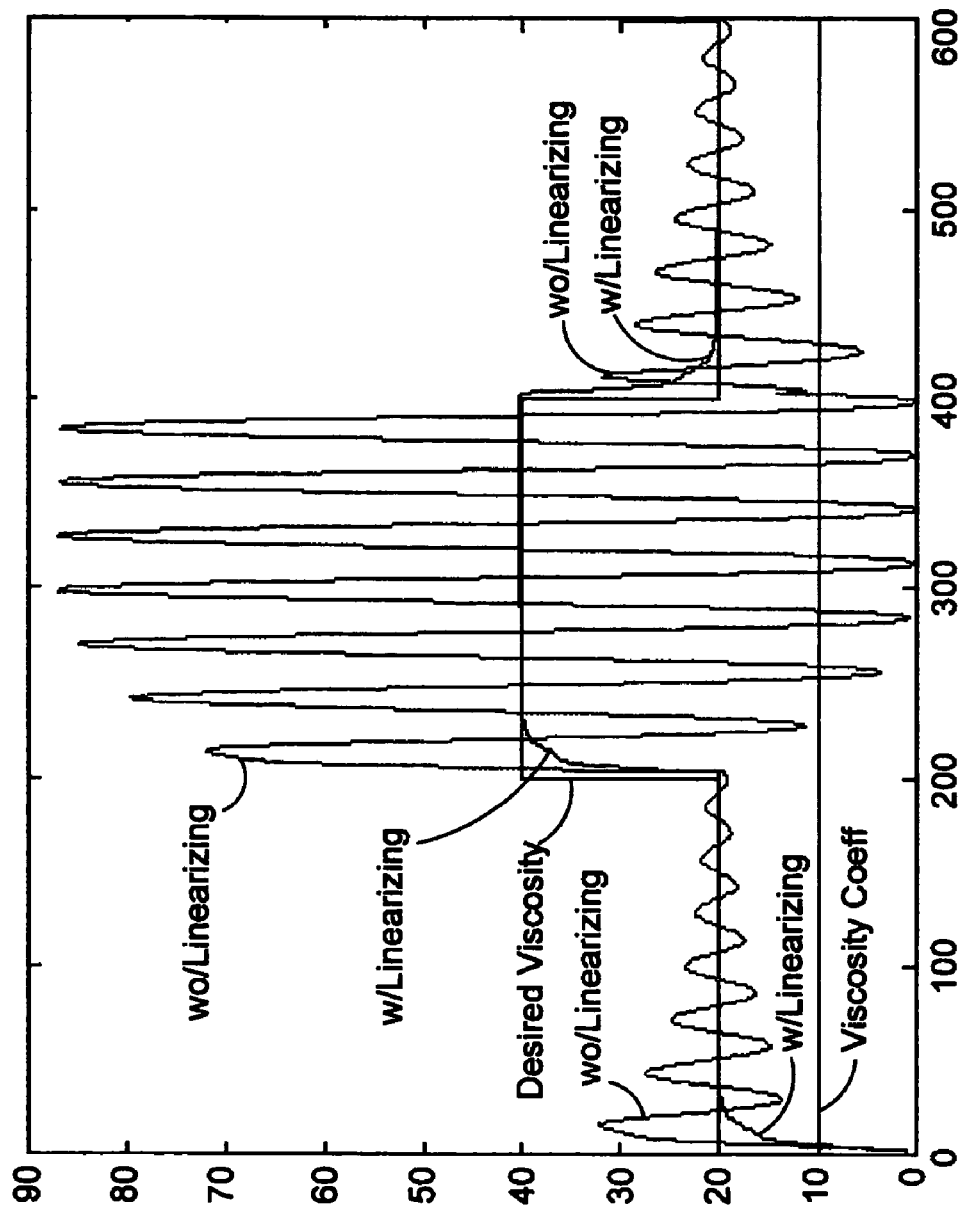
FIG. 10 compares the different graphs obtained with and without a linearizing function to account for nonlinear change relative to the gel input.

FIG. 10 shows the comparison between the different graphs that are obtained with the inclusion and without the inclusion of a linearizing function to account for nonlinear change relative to the gel input. In this particular case, the control block 100 of the system only includes the first control element 120 with and without the linearizing element 140. However, the adaptive control function 130 and the adaptive controller 150 are not part of the controller block 100 in this particular embodiment. The observer block 200 of the system includes the second control element 220, the system model 240, the sensor model 250, and the second and third summation elements 210, 230.

The graph without the linearizing function oscillates with high amplitudes, whereas the graph with the linearizing function is more stable and increases or decreases to quickly reach the desired viscosity without oscillations. It should also be kept in mind that during the period of measurement, the viscosity coefficient remains constant. The viscosity coefficient represents the gel supply, it is basically the viscosity/input. When it is constant, it means that the supply of gel is homogeneous. When it changes, it illustrates the non-homogeneous supply of gel, which is not this operating conditions.

Figure 11:
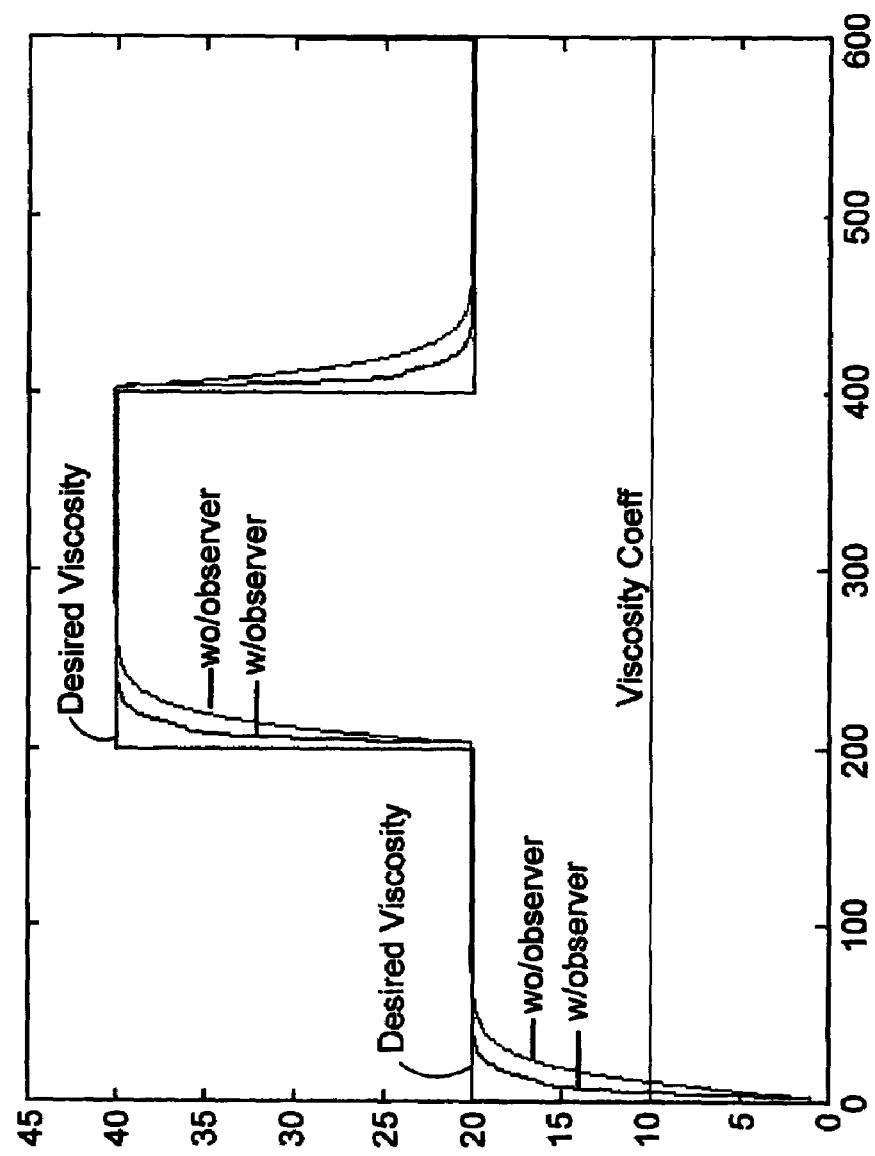
FIG. 11 compares the different graphs obtained with and without a sensor/filter in the observer block.

FIG. 11 shows the comparison between the different graphs that are obtained with and without the inclusion of an observer block 200 which compensates for sensor and filter delays and decreases the response time of the system. In this particular embodiment, the control block 100 of the system includes the first control element 120, the adaptive controller 150 and the adaptive control function 130. The observer block 200 of the system includes the second control element 220, the system model 240, the sensor model 250, and the second and third summation elements 210, 230.

The graph without the observer block takes more time to reach the desired viscosity level, whereas the graph with the observer block has a response time that is shorter such that it increases or decreases faster to reach the desired level. It should also be kept in mind that during the period of measurement, the viscosity coefficient remains constant. The viscosity coefficient which represents viscosity/input of the gel supply indicates that the supply of gel is homogeneous in this case.

Figure 12:
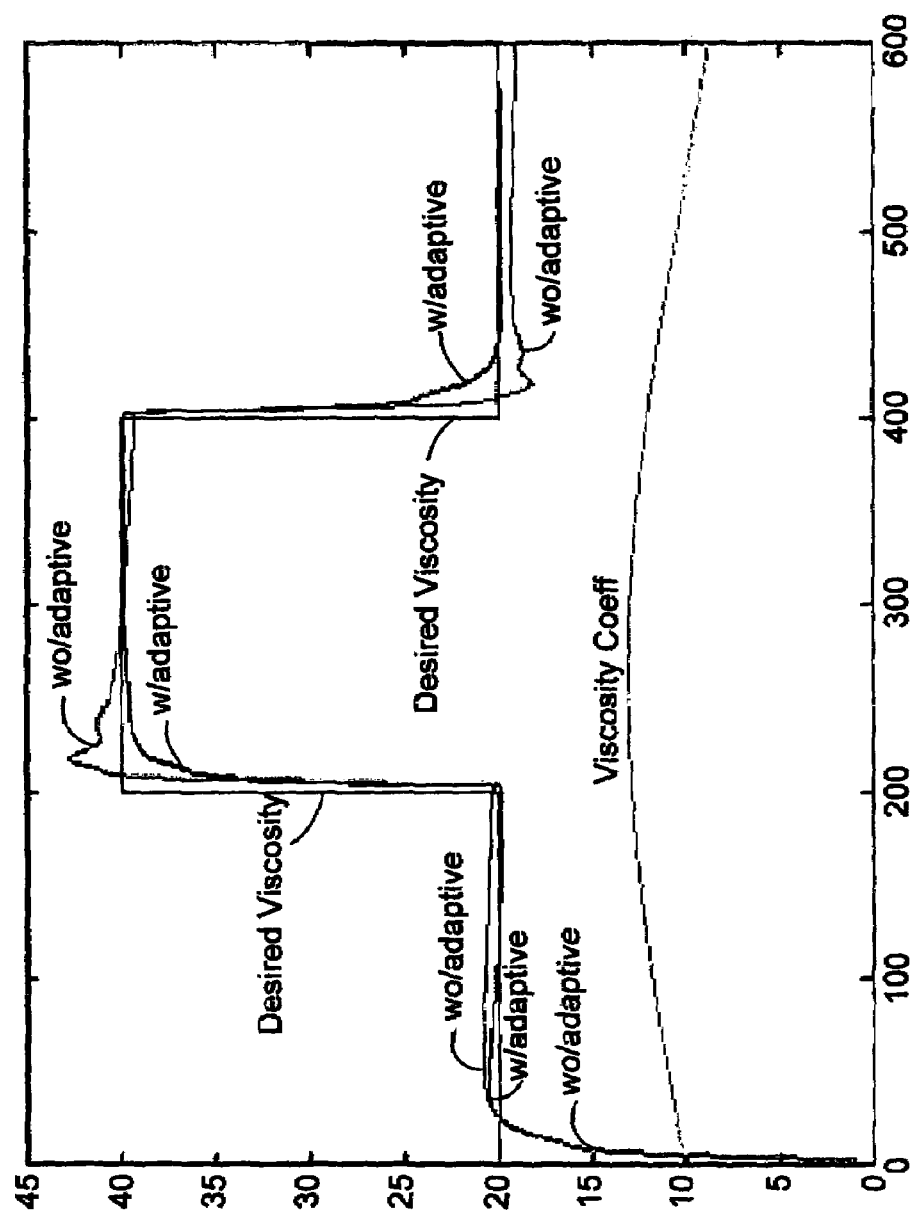
FIG. 12 compares the different graphs obtained with and without an adaptive control function to account for changes in gel viscosity.

FIG. 12 shows the comparison between the different graphs that are obtained with and without the inclusion of an adaptive control function 130 to account for changes in gel viscosity. In this particular case, the default configuration of the control block 100 of the system includes the first control element 120 and the adaptive controller 150. The observer block 200 of the system includes the second control element 220, the system model 240, the sensor model 250, and the second and third summation elements 210, 230.

The graph without the adaptive control function 130 oscillates with some noticeable amplitudes before reaching the desired viscosity, whereas the graph with the adaptive control function 130 is more stable and increases or decreases to reach quickly the desired viscosity without oscillations. It should also be kept in mind that during the period of measurement, the viscosity coefficient is not constant. The viscosity coefficient which represents the viscosity/input of the gel supply indicates the non-homogeneous supply of gel in this operating conditions.

Figure 13:
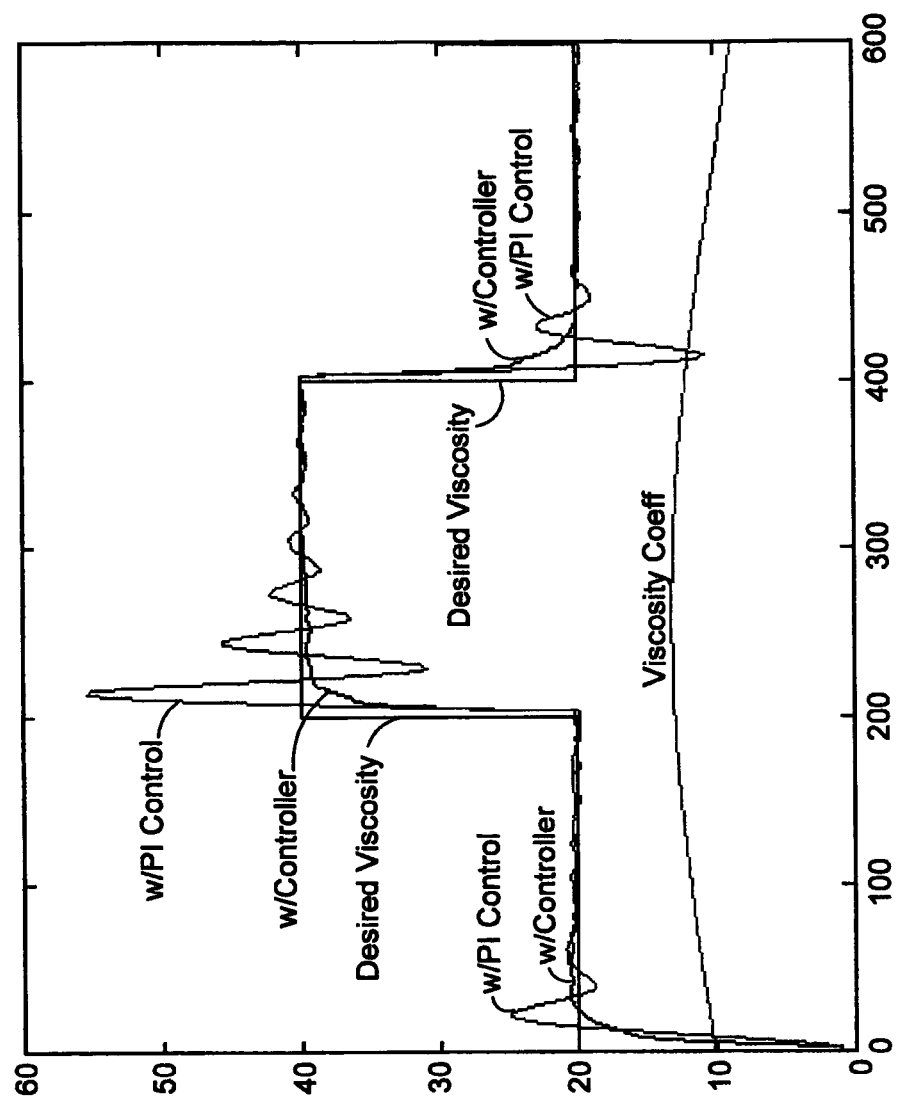
FIG. 13 compares the different graphs obtained with and without the complete elements in the controller block.

FIG. 13 shows the comparison between the different graphs that are obtained with the inclusion of the complete controller block 130 and with the inclusion of a basic PI control as is used in the prior art. In this particular case, the configuration with the complete controller block 100 of the system includes the first control element 120, the adaptive control function 130 and the adaptive controller 150. The linearizing element 140 is not included in this complete controller block 100 of the system. The observer block 200 of the system includes the second control element 220, the system model 240, the sensor model 250, and the second and third summation elements 210, 230.

The graph without the complete controller oscillates with some significant amplitudes before reaching the desired viscosity, whereas the graph with the complete controller increases or decreases to reach quickly the desired viscosity without oscillations. It should also be kept in mind that during the period of measurement, the viscosity coefficient is not constant indicating the non-homogeneous supply of gel in this operating conditions.

The present invention is well-adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving fill cognizance to equivalents in all respects.

What is claimed is:

1. A control system for controlling a viscosity of a fluid in real time, comprising:
a controller for controlling an actuator, the actuator being capable of controlling the viscosity of the fluid by delivering a gelling agent to the fluid;
an observer for estimating the viscosity of the fluid at current time, the observer and the controller are being coupled together;
a first control element having an input which represents an error measured between a desired viscosity and the viscosity estimated by the observer;
an adaptive controller modifying an output of the first control element and generating a signal controlling an input of the actuator;
a second control element having an input and an output;
a system model having an input and an output, the input to the system model being a combination of the output of the first control element and the output from the second control element, the output from the system model being an estimation of the viscosity of the fluid; and
a sensor model having an input and an output, the input to the sensor model being the output from the system model, the output from the sensor model being combined with a measured viscosity to form a viscosity error, the viscosity error being an input to the second control element.

2. The control system of claim 1 wherein the controller further comprises:
a linearization element linearizing the viscosity of the fluid relative to a supply rate of the gelling agent for generating a signal controlling an input of the actuator.

3. The control system of claim 1 wherein the adaptive controller modifies an output of the first control element with an adaptive control function that is a multiplicative function, and wherein the controller further comprises:
a linearization element linearizing the viscosity of the fluid relative to a supply rate of the gelling agent for generating a signal controlling an input of the actuator.

4. The control system of claim 1 wherein the adaptive controller modifies an output of the first control element with an adaptive control function that is a additive function, and wherein the controller further comprises:
a linearization element linearizing the viscosity of the fluid relative to a supply rate of the gelling agent for generating a signal controlling an input of the actuator.

5. The control system of claim 1, wherein the system model includes a spatial and temporal model of the viscosity of the fluid.

6. The control system of claim 1, wherein the sensor model includes a spatial and temporal model of a sensor system, the sensor system measuring the viscosity of the fluid in the system.

7. The control system of claim 1, wherein an input to the adaptive controller is the output from the second control element.

8. The control system of claim 1, wherein:

the first control element further comprises a fluid output gain having an input, the input to the output gain being a volume output rate of the fluid; and an input to the system model further includes a volume output rate of fluid.

9. A control system for controlling a viscosity of a fluid in real time, comprising:

an actuator capable of controlling a viscosity of a fluid by delivering a gelling agent to the fluid, the gelling agent having a supply rate;

a controller for controlling an input to the actuator, the controller comprising:

a first control element;

an adaptive controller modifying an output of the first control element; and a linearization element linearizing the viscosity of the fluid relative to the supply rate of the gelling agent for generating a signal controlling the input of the actuator;

an observer for estimating the viscosity of the fluid at current time, the observer is being coupled to the controller;

a second control element having an input and an output;

a system model having an input and an output, the input to the system model being a combination of the output of the first control element and the output from the second control element, the output from the system model being an estimation of the viscosity of the fluid; and a sensor model having an input and an output, the input to the sensor model being the output from the system model, the output from the sensor model being combined with a measured viscosity to form a viscosity error, the viscosity error being an input to the second control element.

10. The control system of claim 9, wherein the first control element includes one of a proportional-integral (PI) function and a proportional-integral-derivative (PID) function.

11. The control system of claim 9, wherein an input to the first control element includes an error measured between a desired viscosity and the viscosity estimated by the observer.

12. The control system of claim 9, wherein the adaptive controller includes at least one of an integral function, a proportional-integral (PI) function and a proportional-integral-derivative (PID) function.

13. The control system of claim 9, wherein at least one of the actuator, the controller, and the observer include a digital device.

14. The control system of claim 9, wherein at least one of the actuator, the controller, and the observer include a analog device.

15. The control system of claim 9, wherein the output of the first control system is modified by the volume rate of the fluid; and the input to the system model further includes the volume rate of the fluid.

16. The control system of claim 9 wherein the linearization element is defined by the inverse of the function describing the viscosity of the fluid relative to the supply rate of the gelling agent.

17. The control system of claim 9 wherein the adaptive control element reduces an error parameter of the system.

18. The control system of claim 9 wherein the adaptive control element includes a filter.

19. The control system of claim 9 wherein the system model includes a time lag.

20. The control system of claim 9 wherein the system model includes a model of a spatial propagation of the viscosity of the fluid from a source of mixing the gelling agent and the fluid to the viscosity sensor.

21. The control system of claim 9 wherein the sensor model includes a time lag.

22. The control system of claim 9 wherein the system model includes a model of the effect of temperature on the viscosity of the fluid.

23. The control system of claim 9 wherein the system model includes a model of incomplete mixing effects.

* * * * *